(12) United States Patent
Otsuka et al.

(10) Patent No.: US 9,028,311 B2
(45) Date of Patent: May 12, 2015

(54) TARGET GAME INCORPORATING STRATEGY ELEMENTS

(71) Applicant: DeNA Co., Ltd., Tokyo (JP)

(72) Inventors: Takeshi Otsuka, San Francisco, CA (US); Hidde Tonegawa, San Francisco, CA (US); James Marr, San Francisco, CA (US); Simon Paredes, San Francisco, CA (US)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/752,852

(22) Filed: Jan. 29, 2013

(65) Prior Publication Data

US 2014/0213332 A1     Jul. 31, 2014

(51) Int. Cl.
    *A63F 9/24*    (2006.01)
    *A63F 13/00*    (2014.01)
    *A63F 13/20*    (2014.01)
    *A63F 13/40*    (2014.01)
    *A63F 13/30*    (2014.01)

(52) U.S. Cl.
    CPC ............... *A63F 13/06* (2013.01); *A63F 13/10* (2013.01); *A63F 13/12* (2013.01); *A63F 2300/1068* (2013.01); *A63F 2300/409* (2013.01); *A63F 2300/6045* (2013.01); *A63F 2300/64* (2013.01)

(58) Field of Classification Search
CPC ..... A63F 13/00; A63F 13/06; A63F 2300/10; A63F 2300/1068; A63F 2300/1075; A63F 2300/204; A63F 2300/6036; A63F 2300/6045; A63F 2300/64; A63F 2300/643; A63F 2300/646; A63F 2300/8076; G06F 3/0421; G06F 3/0488

USPC ............................. 463/1, 2, 5, 36, 37, 40–43
See application file for complete search history.

(56) References Cited

U.S. PATENT DOCUMENTS

| | | | |
|---|---|---|---|
| 2006/0128468 A1* | 6/2006 | Yoshikawa et al. | 463/36 |
| 2007/0146347 A1* | 6/2007 | Rosenberg | 345/173 |
| 2008/0171595 A1* | 7/2008 | Nakasaka | 463/31 |
| 2011/0092289 A1* | 4/2011 | Dagman et al. | 463/37 |
| 2012/0122553 A1* | 5/2012 | Bunch et al. | 463/23 |
| 2012/0306775 A1* | 12/2012 | Miyachi et al. | 345/173 |
| 2012/0322527 A1* | 12/2012 | Aoki et al. | 463/16 |

OTHER PUBLICATIONS

"Angry Birds iPhone Gameplay Video Review—AppSpy.com" by AppSpy. YouTube—Broadcaster Yourself. [dated Dec. 16, 2009], [online], [retrieved on Jan. 22, 2014]. <URL:http://www.youtube.com/watch?v=olXj_FwJoog>. Including Still Image of Video. 2 Pages.*

(Continued)

*Primary Examiner* — Milap Shah

(57) ABSTRACT

A video game combines finger swiping to hurl a projectile at a target, with strategic elements arising from various combinations of player and target characteristics. User actions such as a direction of finger swipe against a touchscreen, a speed of finger swipe against the touchscreen, and/or a length of finger swipe against the touchscreen, may determine the trajectory and/or force of the projectile. The player may dynamically select specific roles from a plurality of cards available in a deck, with the particular role determining game parameters such as offensive effectiveness and defensive strength. The game may incorporate one or more strategic concepts such as the ability to combine roles, the evolution of roles over time, and the selective enlistment of allies.

18 Claims, 11 Drawing Sheets

(56) References Cited

OTHER PUBLICATIONS

"HellFire Android Gameplay" by Game Info Center. YouTube—Broadcast Yoruself. [dated Nov. 4, 2012], [retrieved on Jan. 22, 2014]. <URL:http://www.youtube.com/watch?v=8wCR4IsVLCo>. Including Still Image of Video. 2 Pages.*

Rich, Bob. "Hellfire Review" by 148Apps.com [online], [dated Nov. 2, 2012], [retrieved on Jan. 22, 2014]. <URL:http://www.148apps.com/reviews/hellfire-review/>. 2 Pages.*

Martin, Rick. "Japan's DeNA Unleashes 'Hellfire' Worldwide" by GamesInAsia.com [online], [dated Nov. 1, 2012], [retrieved on Jan. 22, 2014]. <URL:http://www.gamesinasia.com/dena-hellfire-worldwide/>. 1 Page.*

"Slingshot—AngryBirds Wiki". [dated Jul. 27, 2011], [online], [retrieved on Aug. 26, 2014]. <URL:https://web.archive.org/web/20110727031451/http://angrybirds.wikia.com/w iki/Slingshot>. 1 Page.*

* cited by examiner

TARGET GAME INCORPORATING STRATEGY ELEMENTS

BACKGROUND

The present invention relates to video games and methods and systems therefor.

Video games are popular pastime activities. In the past, video games were played on arcade machines, televisions, and computers. More and more video games are being played on portable devices, such as mobile phones and tablets. The video games that are played on portable or mobile devices are sometimes referred to as "mobile video games." The portable devices (or mobile devices) typically include a touch sensitive display area (or touchscreen) whereon players can view videos and input commands. Many mobile video games enable players to play the games by inputting commands on the touchscreen. Video games that involve the hurling of a projectile at a target by inputting commands on a touchscreen are known. Examples of such games are ANGRY BIRDS and PAPER TOSS. Such games are typically simple in nature, with success depending upon mastery of a relatively few, low-level tactical skills and concepts.

With few opportunities available for the exercise of more complex tactical thinking, however, users may quickly tire of such conventional target games. Accordingly, there is a need in the art for a target games calling for the exercise of strategic judgment by the player.

SUMMARY

The present invention relates to video games and methods and systems therefor. In an embodiment, a video game combines finger swiping or flicking to hurl a projectile at an enemy, with strategic elements arising from various combinations of player and target characteristics. User actions such as a direction of finger swipe against a touchscreen, an acceleration/speed of finger swipe against the touchscreen, a length of finger swipe against the touchscreen, and/or a downward force exerted on the touchscreen, may determine the trajectory of the projectile as well as its momentum. The user may dynamically select specific player roles from a plurality of cards available in a deck, with the particular role determining game parameters such as offensive effectiveness and defensive strength. The game may incorporate one or more strategic concepts such as the ability to combine roles, the evolution of roles, and the enlistment of allies.

In an embodiment, a server system includes a processor; a network interface to receive a request from a client for a video game download; a non-transitory computer readable storage medium having a program for playing a video game that utilizes a touchscreen to receive inputs from a user. The program includes code for displaying an environment including an enemy at a location, code for displaying a projectile, code for receiving an input that extends from a first point to a second point on the touchscreen, the input having a direction component and a speed component, and code for causing the projectile to move to a point of impact according to a trajectory corresponding to the direction component and the speed component of the input.

In an implementation, the input is a swiping motion extending continuously from the first point to the second point on the touchscreen using a finger.

In an implementation, the program includes code for determining whether the projectile has caused damage to the enemy, the damage being determined according to the point of impact relative to the location. The damage is determined according to a projectile attribute relative to an enemy attribute.

In an implementation, the input is used to determine a velocity vector having a magnitude and a direction, and the program further includes code for causing the trajectory of the projectile to reflect the magnitude and the direction of the velocity vector.

In an implementation, the input is used to determine an integral of velocity vectors over a given time.

In an implementation, the program further includes code for causing the enemy to perform an attack after the projectile is moved; and code for displaying an offensive readiness of the enemy. Movement of the projectile marks a turn, and the offensive readiness comprises a counter indicating a number of turns before the attack is performed.

In an implementation, the environment is defined with a predetermined number of rows, and the trajectory of the projectile is configured to always land on one of the predetermined number of rows. There are no more than five predetermined rows or no more than ten predetermined rows.

In another embodiment, a system includes a network; a client having a touchscreen and a communication module; and a server coupled to the client via the network and configured to receive a request from the client for a video game download. The server has a processor, a network interface, and a non-transitory computer readable storage medium. The non-transitory computer readable storage medium has a program for playing a video game that utilizes a touchscreen to receive inputs from a user. The program includes code for displaying on an environment including an enemy at a location, code for displaying a projectile, code for receiving an input that extends from a first point to a second point on the touchscreen, the input having a direction component and a speed component, and code for causing the projectile to move to a point of impact according to a trajectory corresponding to the direction component and the speed component of the input.

In yet another embodiment, a method for playing a game on a mobile device has a touchscreen. The method includes displaying on the touchscreen an environment including an enemy at a location; displaying a projectile on the touchscreen; receiving an input that extends from a first point to a second point on the touchscreen, the input having a direction component and a speed component; and causing the projectile to move to a point of impact on the touchscreen according to a trajectory corresponding to the direction component and the speed component of the input.

DESCRIPTION

The present invention relates to video games and methods and systems therefor. In embodiment, a video game is played on a mobile device having a touchscreen whereon a player can input commands. The video game combines finger swiping or flicking to hurl a projectile at an enemy, with strategic elements arising from various combinations of player and target characteristics. The terms "swiping" and "flicking" are used interchangeably herein. The terms "hurling," "throwing," and "launching" are used interchangeably.

In an embodiment, a video game involves accurately and strategically hurling projectiles at enemies to destroy them. A video game combines finger swiping or flicking to hurl a projectile at an enemy, with strategic elements arising from various combinations of player and target characteristics. User actions such as a direction of finger swipe against a touchscreen, an acceleration/speed of finger swipe against the touchscreen, a length of finger swipe against the touchscreen, and/or a downward force exerted on the touchscreen, may determine the trajectory and/or momentum of the projectile. The player may dynamically select specific player roles from a plurality of cards available in a deck, with the particular role determining game parameters such as offensive effectiveness and defensive strength. The game may incorporate one or more strategic concepts such as the ability to combine roles, the evolution of roles, and the enlistment of allies.

In an embodiment, the trajectory of a projectile is determined by an input made on a touchscreen, e.g., swiping a finger from a first point to a second point on the touchscreen. A velocity vector having a direction component and a speed component can be obtained from the direction and speed of the swipe, which can then be used to affect the trajectory of the projectile. In an implementation, the direction of the projectile corresponds to (or mirrors) the direction component of the velocity vector. Similarly, the speed of the projectile corresponds to (or mirrors) the speed component of the velocity vector. Alternatively, the speed component of the vector can be used to provide a particular momentum to the projectile, where a higher momentum causes a greater damage to the enemy.

In an embodiment, a stylus or an object other than fingers may be used input the swiping command on the touchscreen. In another embodiment, the swiping command is input using an input device other than the touchscreen, e.g., a mouse, a touch pad or a motion detector.

Figure 1A:
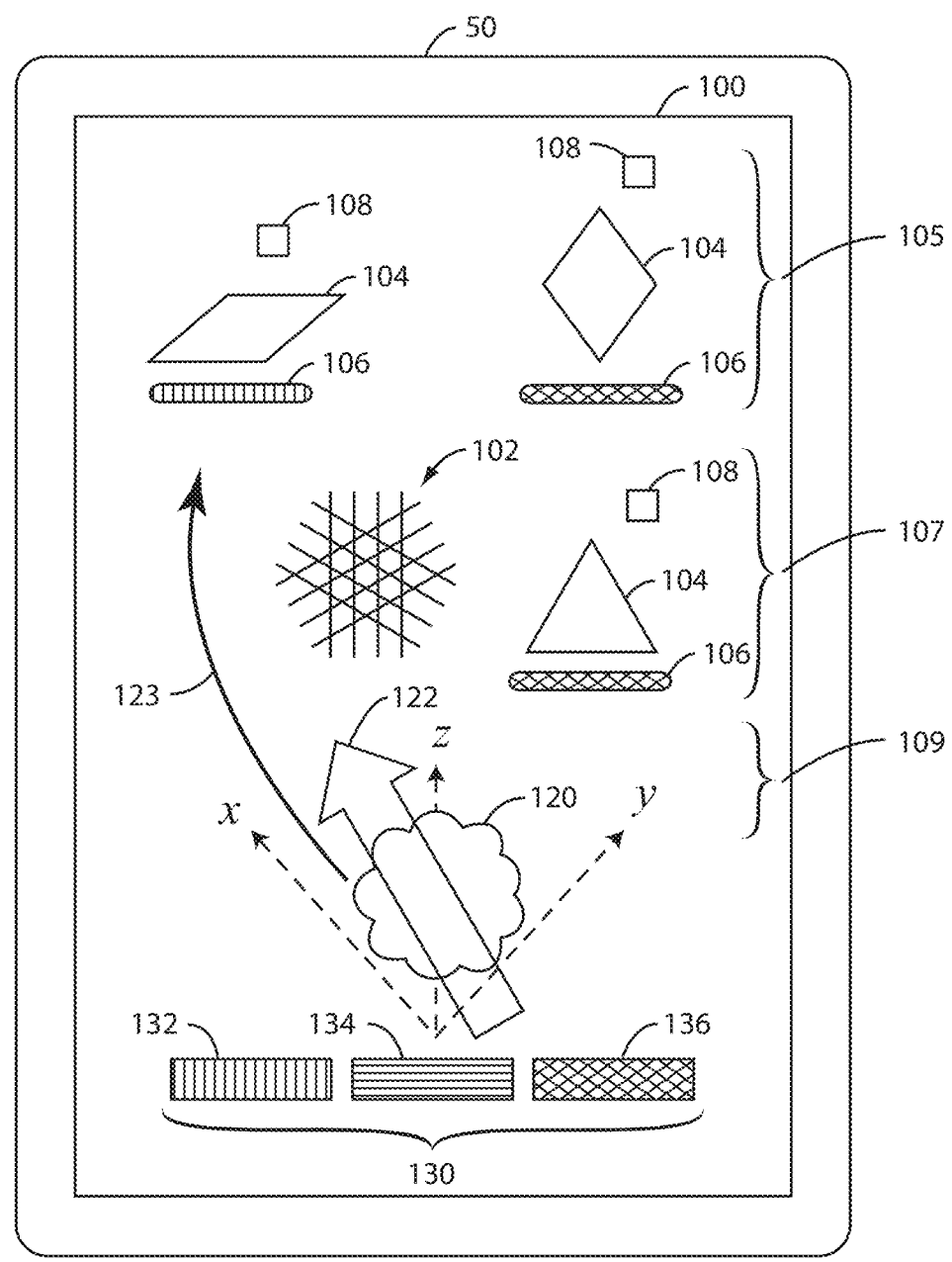
FIG. 1A shows a simplified view of a mobile device having a touchscreen showing a game environment according to an embodiment.

FIG. 1A shows a simplified view of a mobile device 50 having a touchscreen 100 showing a game environment according to an embodiment. In an implementation, the mobile device 50 is a smartphone or tablet having a touchscreen 100 whereon user commands can be inputted. The touchscreen is an electronic visual display that can detect the presence and location of a touch within the display area. The touch and location detected can be a user's finger, a stylus, or the like. Touchscreen 100 comprises a two-dimensional representation 102 of a three dimensional game environment, using X-, Y-, and Z-axes.

Present within the environment are one or more enemies 104. According to certain implementations, the enemies are primarily static within the environment until they are ready to attack. Alternatively, the enemies may be capable of movement within the environment.

Depicted together with the enemy, is an attribute 106 representing one or more characteristics of the enemy. In a particular example, the attribute comprises one of four fundamental elements (e.g. earth, fire, water, and darkness). As discussed in detail below, this attribute of the enemy can determine a number of aspects of game play, and in particular the effectiveness of attacks against that enemy by the player.

In an implementation, enemies 104 are arranged within one or more rows 105, 107. For example, two enemies are provided in row 105 and one enemy is provided in row 107. Accordingly, enemies 104 are arranged horizontally and can only be placed in predefined horizontal positions.

Also depicted with the enemy is a property 108. This property 108 may reflect an offensive readiness of the enemy. As described below, in one particular example, the property 108 could comprise a counter indicating a time until a next enemy attack.

The player is located at the lower portion of the screen of FIG. 1A. The perspective of the user is for the player to be oriented facing the enemies.

A projectile (also referred as "orb") 120 is available to the player to hurl against an enemy. The trajectory and/or the momentum of the projectile may be determined by one or more actions taken by the user. By swiping 122 a finger on touchscreen 100, e.g., across the projectile, the user is able to hurl the projectile along a specific trajectory 123 against the enemy. In addition to a swiping motion, other similar motions may be used, such as flicking, where the direction of a path of the projectile resembles the movement of the motion inputted on the touchscreen.

In an implementation, the trajectory 123 is determined by considering the following: a direction of the flight, energy (or force) to be applied to the projectile, a downward force to be exerted on the projectile, and a resistive force to be exerted on the projectile. In a specific example, the direction of the flight corresponds to and is obtained from the direction component of the velocity vector and the energy to be applied corresponds to and is obtained from the speed component of the velocity vector. The downward force resembling the gravitational force and the resistive force resembling the air resistance may be predefined in the setting of the video game.

For example, the direction of the user's swipe may control movement of the projectile in the X-Y plane, and the speed of the user's swipe may control the force or energy given to the projectile. In an implementation, the height in the Z-axis of the trajectory is determined based on the speed of the swipe. Additionally, the speed of the swipe may be used to determine the speed of the projectile hurled against the enemy, thereby making the hurling of the projectile more intuitive and realistic.

Characteristics in addition to swipe direction and swipe speed may determine the trajectory of the projectile. For example, the length of the user's swipe (i.e., the length of a swipe from a first point to a second point) on the touchscreen may control the speed or energy given to the projectile, so that a longer swipe results in a faster projectile. Alternatively or in addition thereto, spin may be imparted to the projectile according to an input made on the touchscreen.

In another embodiment, a downward force exerted on the touchscreen by a finger may be used to determine the trajectory and/or momentum of the projection. For example, the momentum of the projectile is associated with the downward force exerted on the touchscreen by a finger as it is used to make the swiping motion. The amount of downward force exerted on the touchscreen by a finger can be determined in a number of different ways. One method would be to detect the change in the value of capacitance at certain locations on the touchscreen by using a sensing unit 810 (see FIG. 8).

In yet another embodiment, the trajectory of the projectile is configured so that the projectile will always land on one of the predefined rows or zones, e.g., rows 105, 107, and 109. The rows defined may be no more than 3, 4, 5, 6, 7, 8, 9, or 10. In an implementation, only a few, limited number of rows is provided to make the trajectory of the projectile a little easier to control for the user. For example, this may be accomplished by requiring Y-axis components of the trajectory to have only a small number of discrete values, e.g., no more than 10 discrete values.

Figure 1B:
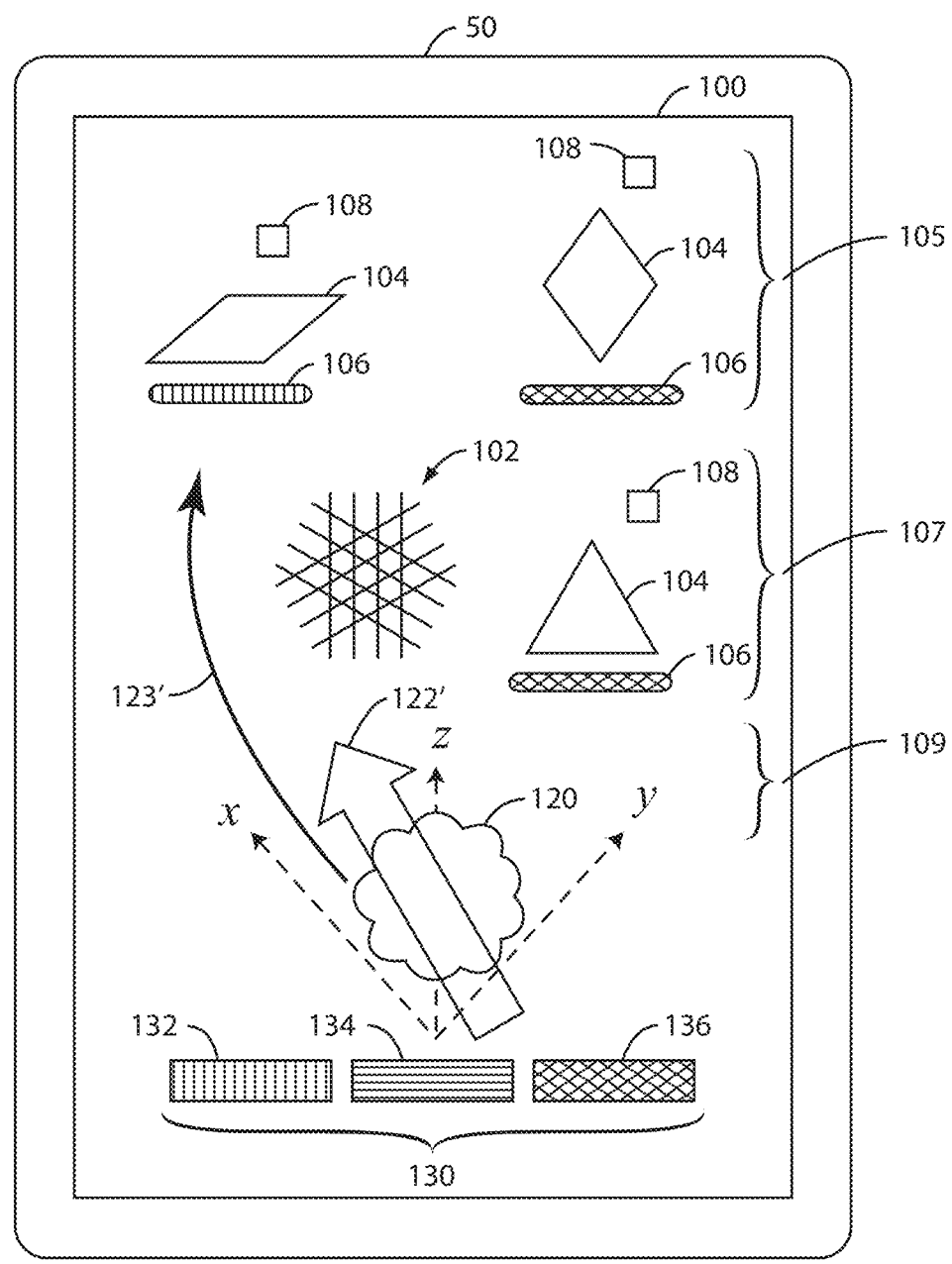
FIG. 1B shows a simplified view of a mobile device having a touchscreen showing a game playfield according to another embodiment.

In an embodiment, the trajectory may be controlled to have a curved path based on a swipe 122' that has a curvature, as shown in FIG. 1B. A resulting trajectory 123' of the projectile has an added curvature compared to trajectory 123 in FIG. 1A. In an implementation, the trajectory 123' is determined by taking an integral of velocity vectors taken over time, thereby providing even more realistic feel to the hurling of the projectile. The energy or force applied to the projectile can be based on the speed of the swipe, the length of the swipe from the start to finish, or a displacement vector defined by the start and finish of the swipe, or a combination thereof.

Referring back to FIG. 1A, the behavior of the projectile may also be determined by the current role being played by the user. For example, a player role 130 may determine the behavior of the projectile against an enemy. The player role includes one or more specific player attributes 132, 134, and 136. In an implementation, a particular attribute can result in enhanced damage of a projectile against an enemy. Details regarding this aspect are described in detail below.

Figure 1C:
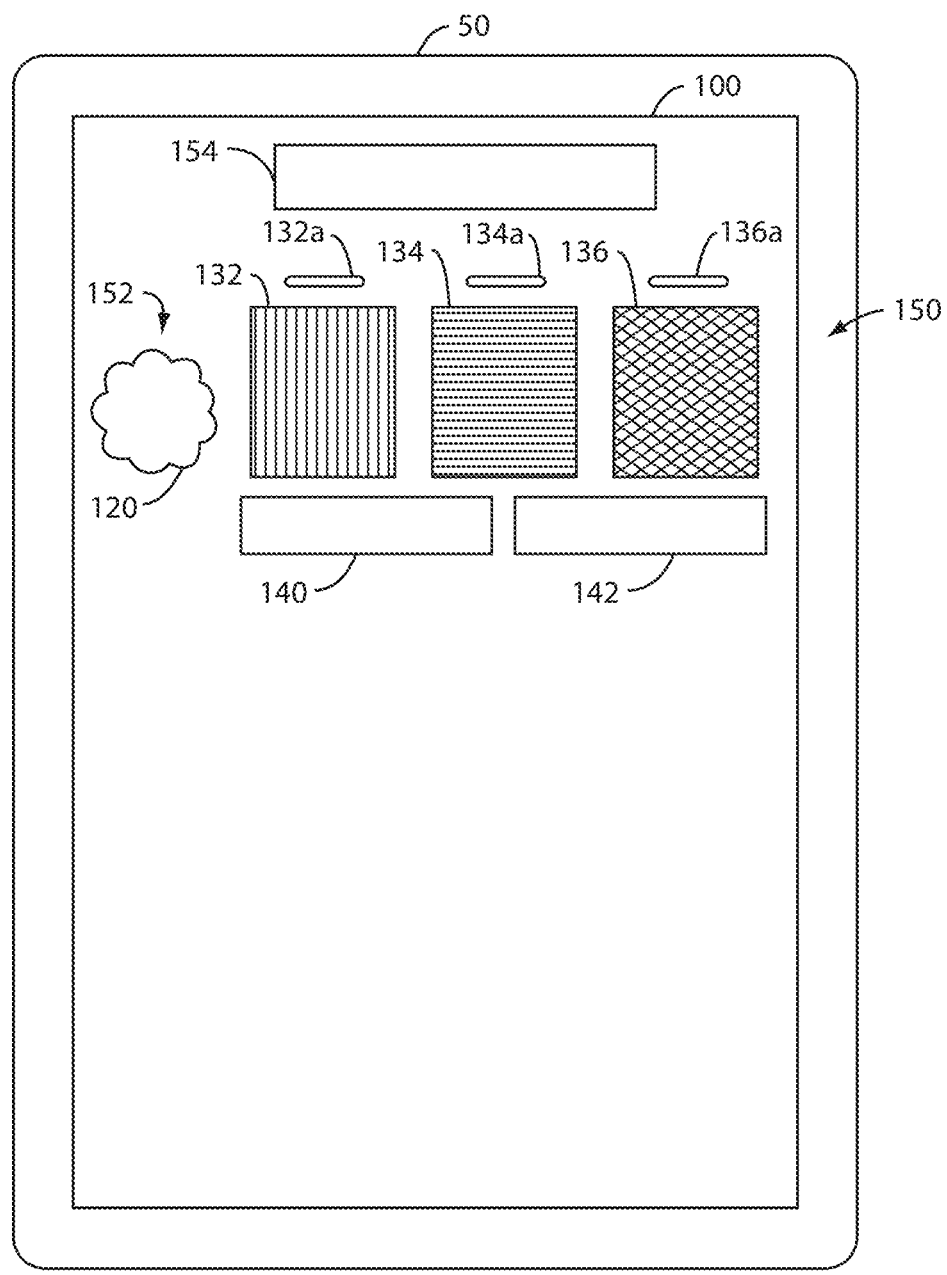
FIG. 1C shows a simplified view of a mobile device having a touchscreen showing a role-playing deck of cards according to an embodiment.

FIG. 1C illustrates a touchscreen 100 showing a role-playing deck of cards 150 according to an embodiment. A player role may be derived from an individual card that forms part of a deck. Deck of cards 150 defines a player role that may comprise information including but not limited to:

- an icon 152 of the projectile (or orb);
- a role name 154;
- identities of the attributes 132, 134, 136 available to the player;
- respective magnitudes 132*a*, 134*a*, 136*a* of those attributes;
- offensive effectiveness 140; and
- defensive strength 142.

As further noted below, a user may have more than one role available to switch between during game play. Groupings of available roles may be referred to as squads, and the ability of the user to dynamically switch between roles can contribute strategic aspects to the gaming experience.

It is further noted that a user may have the ability to gain a destroyed enemy. The attributes so acquired, may provide a user with additional options allowing him or her to progress further in the game. It is also possible for a user to enlist the aid of an ally over the course of the game. The ally provides the user with additional resources (e.g. attributes, offensive capabilities, defensive strength) to rely upon at later stages.

Figure 1D:
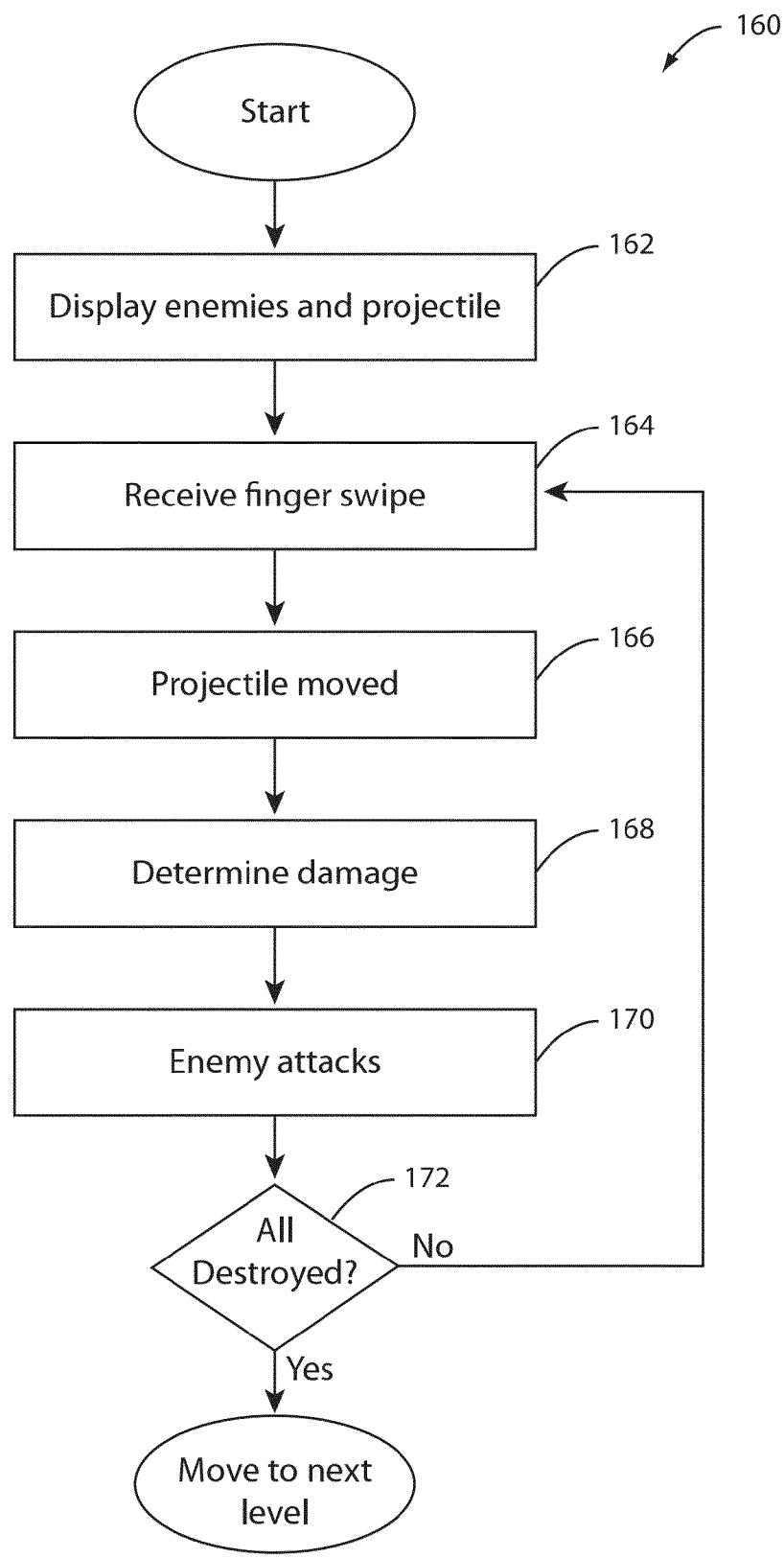
FIG. 1D is a simplified diagram showing a process for playing a video game according to an embodiment.

FIG. 1D is a simplified diagram showing a process 160 for playing a video game according to an embodiment. After launching the process, a touchscreen is caused to display an environment including one or more enemies and a projectile (step 162). The touchscreen receives an input comprising a finger swipe, from which a swipe direction and a swipe speed are obtained (step 164). The swiping motion is detected by a sensing unit 810 (see FIG. 8) and is translated to a velocity vector by a controller 802 (see FIG. 8), which is used to determine the trajectory of the projectile. For example, a swiping motion with a higher acceleration (or speed) will cause the projectile to fly faster and/or higher to cover a longer distance. In an implementation, the momentum of the projectile may be associated with the attack points so that those with a higher momentum would cause a greater damage to the enemy.

Based upon the input received on the touchscreen, the screen is caused to move the projectile to a point of impact according to a trajectory corresponding to the swipe direction and the swipe speed (step 166). A determination is made whether the projectile has damaged the enemy (step 168). The enemy may be caused to attack depending on the value of a counter associated with the enemy (step 170). If all the enemies are destroyed, the player advances to the next level (step 172).

The above generic description is now further illustrated in connection with a specific example of the screen shots of FIGS. 2-5. In this example, the projectile is referred to as an "orb", and it is the goal of the user to destroy as many enemies as possible and thereby proceed to higher levels in the game.

A user first selects a plurality of game cards having parameter(s), in order to create a card deck. The deck has parameters which are determined based upon the cards that are included in the deck 150 (see FIG. 1C). In an implementation, the parameters of the cards in a deck are summed to arrive at the parameters for the deck. These parameters are assigned to the orb for that deck, i.e., to a player role associated with that orb.

An example of such a parameter is offensive effectiveness, referred to herein as attack points (Atk). Another example of a parameter is defensive strength, referred to herein as hit points (HP).

The input device detects a user's motion, in order to hurl the orb at an enemy. In this particular example, the input device comprises a touchscreen and a sensing unit of a smart phone, and the user's motion comprises swiping or flicking a finger on the touchscreen. This swiping motion on the touchscreen is converted to a velocity vector to impart trajectory and momentum to the orb. The trajectory of the orb is determined based on the direction of the vector, and the speed of the orb is determined based on the magnitude of the vector. In other words, the flying direction and distance of the projectile are determined by the input. Thus, a finger swipe to the left may cause the projectile to fly in the left direction. Quickly swiping a finger across the surface of the touchscreen may cause the projectile to fly over long distance and/or at a faster speed.

In an implementation, the flight path of the orb can be controlled by making non-linear swiping motions on the touchscreen (see FIG. 1B). The trajectory of the orb could include one or more curved paths according to the curved motion of the swipe. The trajectory and the momentum of the orb can be controlled by means other than the velocity vector of the swipe on the touchscreen. For example, the length of the swipe and the downward force exerted on the touchscreen can also be used to affect the trajectory and the speed of the orb.

The enemy may receive damage from a hurled projectile. The amount of damage may be determined by distance between the enemy and the place where the orb hits, as well the speed of the orb at the time of the impact.

In an implementation, a parameter of the deck may be used to determine the amount of damage inflicted on the enemy. Each projectile and each enemy may possess one or more attributes, such as the elements: fire, water, earth, and darkness. An amount of damage is determined by an affinity between a projectile's attribute, and enemy's attribute. For example, an orb having the attribute of water (which may be displayed on the screen as blue), may do the most damage against an enemy having the attribute of fire (which may be displayed on the screen as red). Conversely, fire orbs may do more damage against dark enemies, earth orbs may do more damage against water enemies, and, darkness orbs may do more damage against earth enemies.

Figure 2:
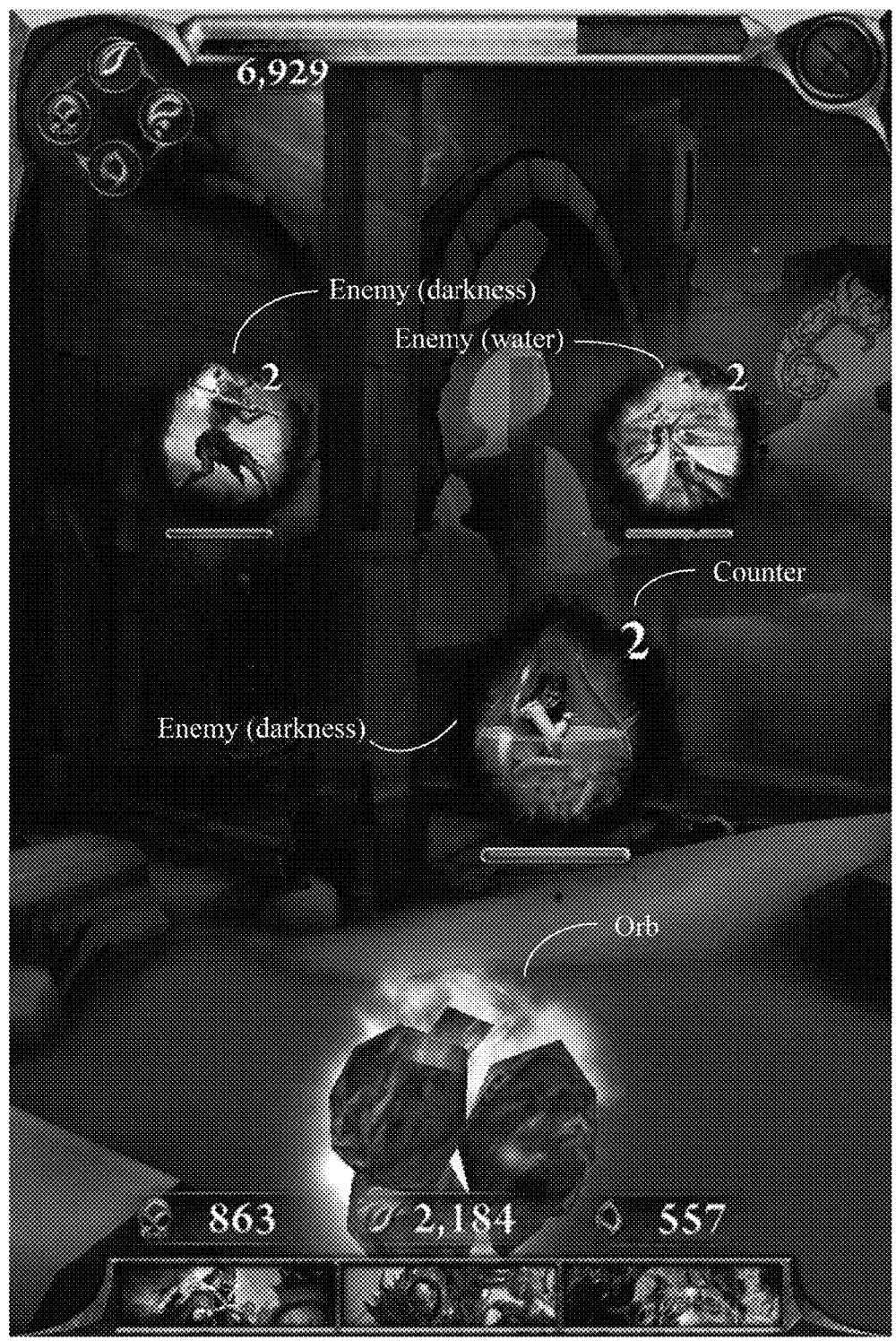
FIG. 2 shows a screen shot of a game playfield according to one example.

FIG. 2 shows a mission game scene. In mission mode, the player may cast an orb at enemies (creatures) in order to destroy them. If all enemies on the screen are destroyed, player can proceed to the next level.

When the player destroys the enemy, the player may gain the enemy as a game card. The player can then incorporate the enemy into his or her card deck.

Game modes other than "mission" are possible. For example, in a boss battle mode, the user may be faced with multiple enemies, one of whom (the boss) has primacy. Destruction of the boss can automatically result in the elimination of the other enemies. In such a boss battle game mode, the user may exercise strategic judgment in order to eliminate the boss enemy as soon as possible to avoid greater damage, even at the expense of sustaining some initial damage from underlings controlled by the boss enemy.

As mentioned previously, the input device receives player's motion as input. In this working example, a touchscreen is used as input device. The user swipes on the screen (around the orb) with a finger, in order to cast the orb at the enemy.

Flying direction and flying distance of the orb are determined according to the particular way that the player swipes. If a user swipes to the left, then the orb flies in the left direction. If a user swipes fast, then the orb flies over longer distance, so that the speed or acceleration of the swipe determines the distance of travel for the orb. Alternatively, the distance of travel for the orb may be determined by the swiping distance, and the speed or acceleration of the swipe may determine the speed of the orb.

Hitting judgment is determined by the distance between target enemy, and the point where the object hit. It may be graded by three levels such as: "critical", "hit", and "miss".

An amount of damage can be determined by the hitting judgment. For example, when the orb hits center of enemy figure, it may be judged as a "critical" hit, inflicting the most damage upon an enemy. On the other hand, "hit" inflicts less damage than "critical" but more damage than "miss."

In the mission screen, there is a counter above each enemy. This counter indicates when the enemy can attack. In an implementation, the counter represents a number of remaining turns before the enemy can attack. Hurling of an orb by a user counts as a turn and lowers the counter by one. If the counter reaches zero, the enemy attacks. In another implementation, the counter may be a timer that ticks down at a predefined rate, where the enemy attacks when the counter ticks down to zero.

Success by the user in playing the game may be dictated by strategic, as well as tactical, skills. For example, a user will succeed by accurately throwing the orb at the enemies. A user must also carefully prioritize on-screen enemies in order to destroy them efficiently. Thus the user should strategically attempt to inflict large amount of damage on enemies, while attempting to be exposed to as little damage as possible in order to prolong survival. These strategic considerations can enhance the game play experience over and above a conventional target game.

Figure 3:
FIG. 3 shows another screenshot of the example game of FIG. 2.
Figure 4:
FIG. 4 shows yet another screenshot of the example game of FIG. 2.

FIG. 3 shows player's card deck. In this example, the deck has a plurality of player roles, which may be presented in groups (squads). In an implementation, each squad includes three game cards, where each game card represents a creature having particular attributes. Each squad/group has a corresponding orb.

An orb has elemental attributes derived from the cards in the squad. For example, group 1 includes dark and water creatures. Accordingly, orb 1 corresponding to group 1 has dark and water element attributes. The groupings of the squad can be changed by adding and removing the game cards in the squad as needed by the player.

In an implementation, orbs 1, 2, and 3 are used in the mission mode in order. If a player desires, the order of orbs 1, 2, and 3 can be changed to more effectively attack or defend against the enemies presented against the player.

A striking power of the orb is determined by creatures which are included in the group corresponding to the orb. Each creature has hit points (HPs) and attack points (Atks). The sum of attack points of creatures in the group, is the orb's striking power.

Players can reinforce their game cards by synthesizing or fusing one card with other card(s). First, a player chooses base creature to reinforce. Then the player chooses cards which are to be synthesized with the base card. By reinforcing a game card in this manner, the creature associated with the base card becomes stronger and evolves into a stronger creature. This evolution or level-up process enables the creature associated with the base card to have higher hit points and higher attack points.

A player can take his friend (ally) on a mission. When a player elects to have an ally, a list of player's friends/allies is displayed. The player can select a friend to accompany (see FIG. 4). The ally can assist the player and attack the enemies. A player may receive points if an ally is selected to accompany the player to a mission. By using the points, the player may get a new game card.

Figure 5:
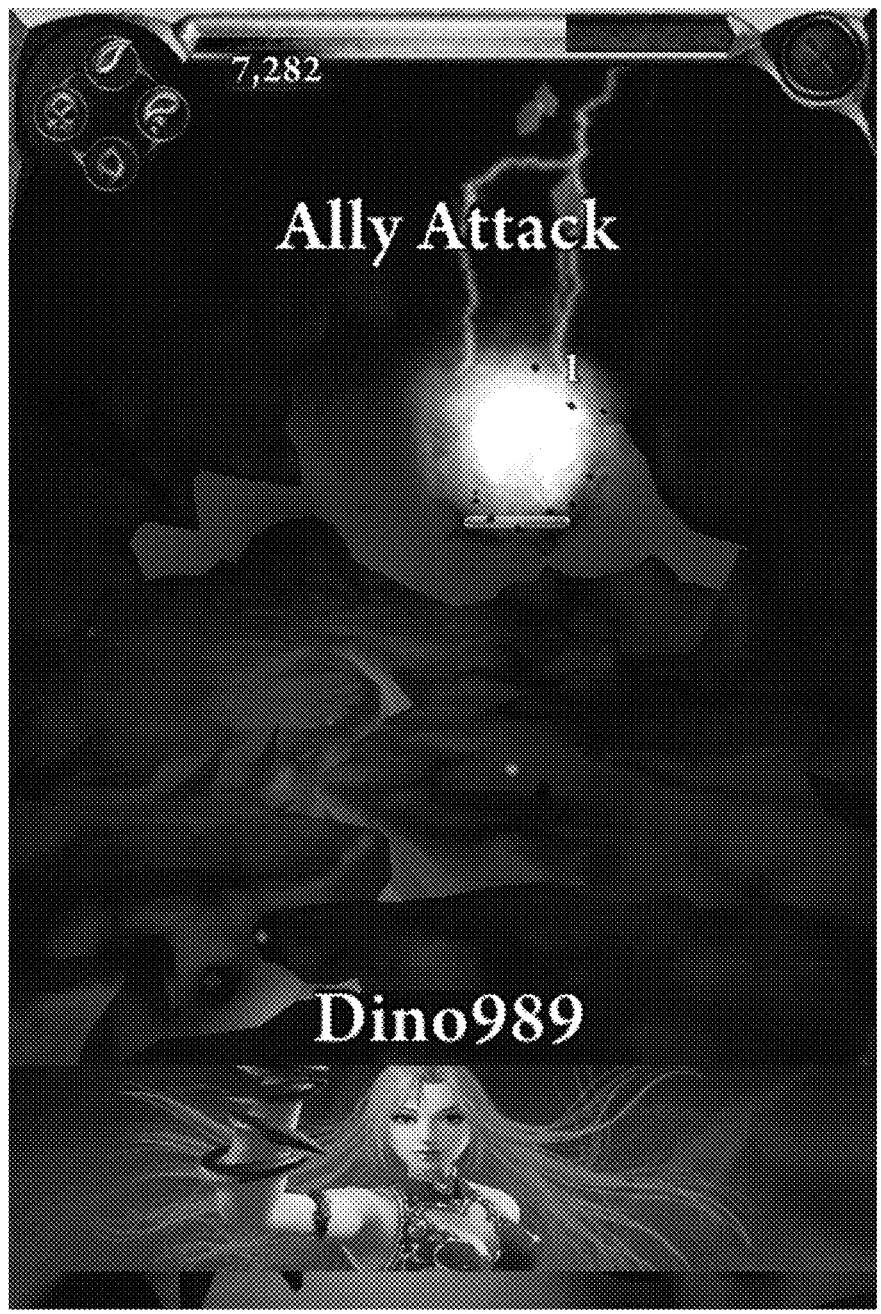
FIG. 5 shows still another screenshot of the example game of FIG. 2.

In addition, a player can enlist the aid of other players (including a player who is not in the player's list of allies) in the mission. In an implementation, these other players may randomly appear in order to aid the player in his mission. This random appearance can be used to make new friends while playing the game, as shown in FIG. 5.

Figure 6:
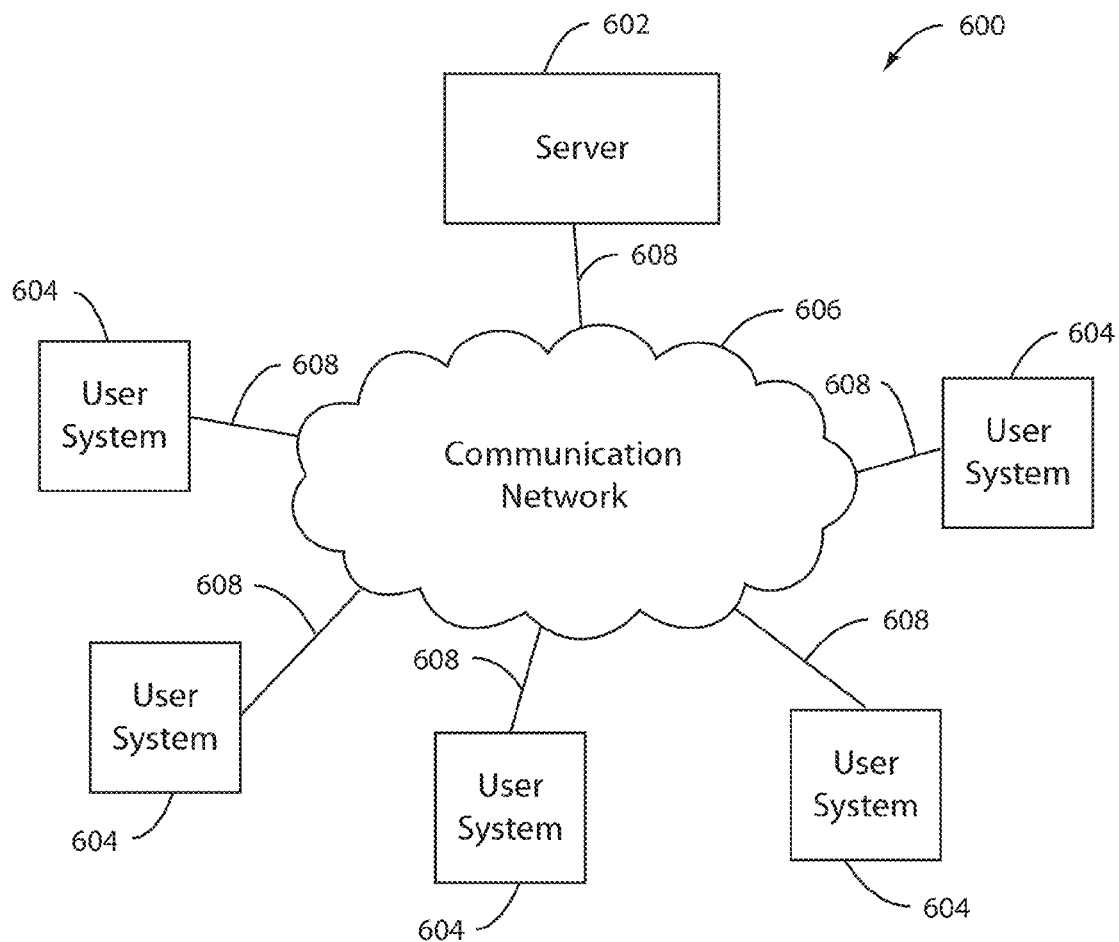
FIG. 6 shows a simplified view of a communications system over which an embodiment may be implemented.

Embodiments of video games as described herein may be deployed on a user device via a communications system. In particular, FIG. 6 shows a simplified view of a communications system. The communication system 600 comprises a server 602 which is in communication with a communications network 606 via a communications link 608. FIG. 6 shows a plurality of user systems 604 that are in communication with the communications network via links 608. Server 602 provides the backend support for playing the video game. For example, the friend's list and random appearance of other players may be coordinated by server 602. Server 602 also enables the user systems to download the game, send alerts or messages to the user systems and provide updates to the game.

User systems 604 may be smart phones, tablets, laptops, all-in-one computers, or any other computing device that is suitable for playing video games. The user system should have a screen to display the video and an input device to input commands. Both of these functionalities can be provided by a touchscreen. Communication links 608 may be of the wired or wireless variety. Similarly, the communications network itself may comprise wired and/or wireless components.

Figure 7:
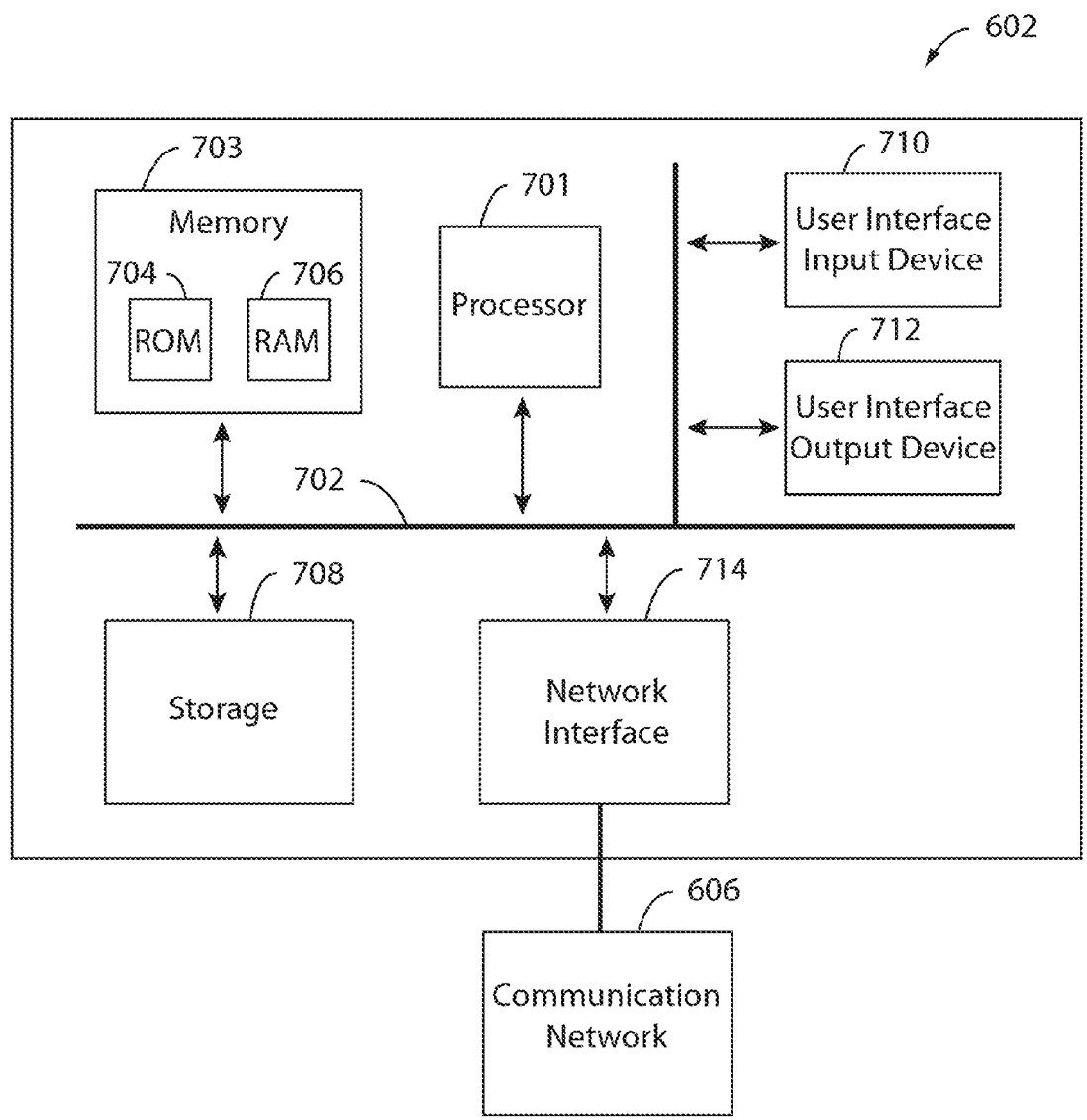
FIG. 7 shows a simplified view of a server element of the communications system of FIG. 6.

FIG. 7 shows a simplified view of components in server 602 in FIG. 6. Server 602 comprises a processor or CPU 701 that is in communication with a variety of other elements via a bus 702. Such other components of the server include but are not limited to a non-transitory computer readable storage medium as a memory 703, including a Read Only Memory (ROM) 704 and a Random Access Memory (RAM) 706, and also a higher capacity non-transitory computer readable storage medium 708. One or more of these elements may be employed by the server to store the computer code representing the instructions for operating the video game. This computer code may be sent from the server over the communication network to a user device, to allow a user to download the video game.

An administrator or other authorized personnel may communicate with the server via a user interface input device 710 (e.g. a keyboard, mouse), for example to update or modify the code being disseminated to the various user devices. The administrator or other authorized personnel may receive information from the server via a user interface output device 712 such as a display screen. This received information may comprise user registrations and/or subscriptions.

FIG. 7 also shows the server as including a network interface element 714. This network interface is configured to allow information to be communicated between the server and the communications network. An example of such information is the computer code that is executable on the user system to run the video game. Although FIG. 7 illustrates the components of server 602, some of user systems 604 may have the same or similar components thereto.

Figure 8:
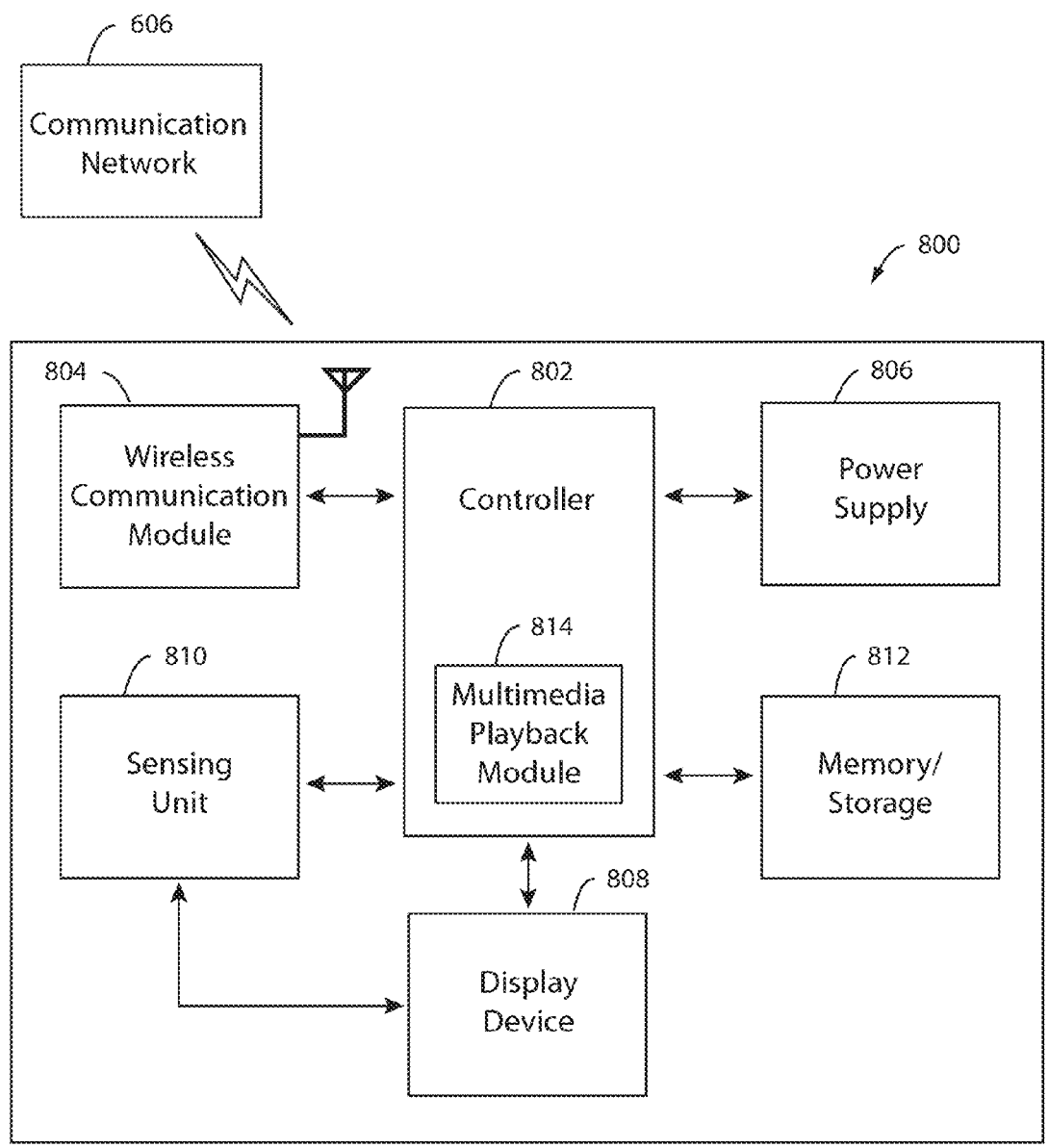
FIG. 8 shows a simplified view of a user device of the communications system of FIG. 6.

FIG. 8 shows a simplified view of a user device 800 which is a type of user systems 604. User device 800 may be a smart phone or tablet and includes a controller 802 for controlling the operation of the user device, a wireless communication module 804 for communicating with a network, a power supply 806, a display device 808, a sensing unit 810, and a memory/storage unit 812.

Wireless communications module 806 is used to communicate with a wireless network and receive a video game from server 602. The video game or data file received from the server is stored in the memory/storage unit 812 using controller 802. The video game comprises computer code for executing various steps needed to play the video game. Once the game is downloaded to the storage unit, the user device can play the game without being connected to server 602. Alternatively, the game may require user device 800 to remain in communication with server 602 to play the game, or at least receive a key or a portion of the video game each time the user wishes to launch the game.

The video game is launched and played using a multimedia playback module 814. The video game is displayed on display device 808 (e.g. a touchscreen) that can also receive inputs from a user. Sensing unit 810 senses inputs made on the touchscreen including the swiping motions and amounts of downward force exerted thereon. Controller 802 determines a velocity vector based on the input sensed by the sensing unit.

Having thus described exemplary embodiments, it should be noted by those skilled in the art that the disclosures within are exemplary only, and that various other alternatives, adaptations, and modifications are possible. For example, swiping motions inputted on a touchscreen can be replaced with flicking or similar motions. Also the swiping motions or the like may be input on a device other than a touchscreen, e.g., a touchpad and a motion sensor including a camera. Accordingly, embodiments are not limited to the specific structures or methods as illustrated and taught herein.

What is claimed is:

1. A server system comprising
a processor;
a network interface to receive a request from a client for download of a video game program;
a non-transitory computer readable storage medium having stored thereon the video game program for playing a video game that utilizes a touchscreen of a computing device to receive inputs from a user, the video game program executable by the processor to cause the processor to perform a method, the method comprising:
displaying an environment including an enemy at a first location;
displaying a projectile in the environment at a second location associated with the user;
receiving an input that extends from a first point to a second point on the touchscreen, the input having a direction component and a speed component;
causing the projectile to move from the second location to a point of impact towards the first location according to a trajectory calculated based on the direction component and the speed component of the input;
causing the enemy to perform an attack from the first location towards the second location after the projectile is moved; and
displaying an offensive readiness of the enemy,
wherein movement of the projectile marks a turn for the user, and the offensive readiness comprises a counter indicating a number of turns the user has remaining before the attack is performed.

2. The server system of claim 1 wherein the input is a swiping motion extending continuously from the first point to the second point on the touchscreen using a finger.

3. The server system of claim 2 wherein the method further includes determining whether the projectile has caused damage to the enemy, the damage being determined according to the point of impact relative to the location.

4. The server system of claim 2 wherein the damage is determined according to a projectile attribute relative to an enemy attribute.

5. The server system of claim 1 wherein the input is used to determine a velocity vector having a magnitude and a direction, and
wherein the method further includes causing the trajectory of the projectile to reflect the magnitude and the direction of the velocity vector.

6. The server system of claim 5 wherein the input is used to determine an integral of velocity vectors over a given time.

7. The server system of claim 1, wherein the environment is defined with a predetermined number of rows, and
wherein the trajectory of the projectile is configured to always land on one of the predetermined number of rows.

8. The server system of claim 7, wherein there are no more than five predetermined rows.

9. The server system of claim 7, wherein there are no more than ten predetermined rows.

10. A system comprising
a network;
a client having a touchscreen and a communication module; and
a server coupled to the client via the network and configured to receive a request from the client for download of a video game program, the server having a processor, a network interface, and a non-transitory computer readable storage medium, wherein the non-transitory computer readable storage medium has stored thereon the video game program for playing a video game that utilizes a touchscreen to receive inputs from a user, the video game program executable by the processor to cause the processor to perform a method, the method including:

displaying an environment including an enemy at a first location;

displaying a projectile in the environment at a second location associated with the user;

receiving an input that extends from a first point to a second point on the touchscreen, the input having a direction component and a speed component;

causing the projectile to move from the second location to a point of impact towards the first location according to a trajectory calculated based on the direction component and the speed component of the input;

causing the enemy to perform an attack from the first location towards the second location after the projectile is moved; and displaying an offensive readiness of the enemy, wherein movement of the projectile marks a turn for the user, and the offensive readiness comprises a counter indicating a number of turns the user has remaining before the attack is performed.

11. The server system of claim 10, wherein the input is a swiping motion extending continuously from the first point to the second point on the touchscreen using a finger.

12. The server system of claim 11 wherein the method further includes determining whether the projectile has caused damage to the enemy, the damage being determined according to the point of impact relative to the location.

13. The server system of claim 10, wherein the input is used to determine a velocity vector having a magnitude and a direction, and wherein the method further includes causing the trajectory of the projectile to reflect the magnitude and the direction of the velocity vector.

14. The server system of claim 13, wherein the input is used to determine an integral of velocity vectors over a given time.

15. The server system of claim 10, wherein the environment is defined with a predetermined number of rows, and wherein the trajectory of the projectile is configured to always land on one of the predetermined number of rows.

16. The server system of claim 15 wherein there are no more than five predetermined rows.

17. The server system of claim 15 wherein there are no more than ten predetermined rows.

18. A method for playing a game on a mobile device having a touchscreen, the method comprising:

displaying on the touchscreen an environment including an enemy at a first location;

displaying a projectile on the touchscreen in the environment at a second location associated with the user;

receiving an input that extends from a first point to a second point on the touchscreen, the input having a direction component and a speed component; and causing the projectile to move from the second location to a point of impact towards the first location on the touchscreen according to a trajectory calculated based on the direction component and the speed component of the input;

causing the enemy to perform an attack from the first location towards the second location after the projectile is moved; and displaying an offensive readiness of the enemy, wherein movement of the projectile marks a turn for the user, and the offensive readiness comprises a counter indicating a number of turns the user has remaining before the attack is performed.

* * * * *